United States Patent
Groepper (10) Patent No.: US 6,582,214 B1
(45) Date of Patent: Jun. 24, 2003

(54) MOLD OPENING AND FOOD PRODUCT EXTRACTING APPARATUS

(75) Inventor: Rodney D. Groepper, Cherokee, IA (US)

(73) Assignee: Continental Deli Foods, Inc., Springdale, AR (US)

(*) Notice: Subject to any disclaimer, the term of this patent is extended or adjusted under 35 U.S.C. 154(b) by 0 days.

(21) Appl. No.: 09/576,573

(22) Filed: May 22, 2000

(51) Int. Cl.[7] .............................................. B29C 33/20
(52) U.S. Cl. .................... 425/139; 425/140; 425/150; 425/443
(58) Field of Search .................. 425/DIG. 108, 425/139, 182, 188, 195, 441, 442, 443, 436 R, 140, 150

(56) References Cited

U.S. PATENT DOCUMENTS

| | | | | |
|---|---|---|---|---|
| 3,894,379 A | * | 7/1975 | Naggert | 53/486 |
| 4,534,286 A | * | 8/1985 | Franzke | 100/219 |
| 4,871,306 A | * | 10/1989 | Imperi | 425/437 |
| 4,973,240 A | * | 11/1990 | Reilly | 425/198 |
| 5,002,711 A | * | 3/1991 | Iwama et al. | 264/71 |
| 5,520,097 A | * | 5/1996 | Cody et al. | 99/353 |
| 5,716,265 A | * | 2/1998 | Lagares Corominas | 452/174 |
| 6,021,995 A | * | 2/2000 | Cody | 249/155 |

FOREIGN PATENT DOCUMENTS

EP 0138653 * 9/1984

* cited by examiner

Primary Examiner—Jan H. Silbaugh
Assistant Examiner—Emmanuel Luk
(74) Attorney, Agent, or Firm—McAfee & Taft (57) ABSTRACT

An automatic mold opening and food product extracting apparatus. The apparatus includes a first conveyor for moving a food mold with a food product therein from a staging gate to a delatcher and further to a time-delay gate. The staging gate controls movement of the molds and food products therein into the delatcher. The delatcher engages the mold such that the first and second portions are unlatched. A second conveyor is disposed above a portion of the first conveyor. The time-delay gate controls movement of the molds toward the second conveyor. Gripping pads on the second conveyor grippingly engage the second portion of the mold so that the second portion is raised above the first portion and the food product originally in the mold. The separation may be provided by gravity or by a lid puller device when proper separation does not occur. Actuation of the lid puller device is controlled by a pivot gate which senses whether the first mold portion and food product have been properly separated from the second mold portion. Another cylinder is used to displace the food product off of the first mold portion, after which the food product is moved to another area, and the mold portions are sent to a washing area.

57 Claims, 8 Drawing Sheets

STAGING GATE

FIG. 9

DELATCHER

FIG. 10

MOLD OPENING AND FOOD PRODUCT EXTRACTING APPARATUS

BACKGROUND OF THE INVENTION

1. Field of the Invention

This invention relates to the opening of molds used for molding a food product and extracting the food product therefrom, and more particularly, to an apparatus for automatically opening such molds and extracting the food product.

2. Description of the Prior Art

A variety of food products are made by using a mold in which food material is placed and then heated. An example of such a food product is a "honey ham" so named because the ham does have honey in it and it also has the appearance of a beehive. Such a product is typically molded in a two-piece mold, usually made of stainless steel. The mold has a first portion, such as a lid, and a second portion, such as the main portion of the mold or pan. The lid and pan are latched together for the cooking process. First, an emulsion is prepared comprising a combination of different mussels, brines and other materials and then dispensed by weight into, and sealed in, a plastic bag. The plastic bag with the emulsion therein is inserted into the mold. The emulsion is in a semi-liquid stage, with some texture, at this point.

The mold, with the plastic bag and emulsion inserted therein, is hung in a smokehouse where the emulsion is cooked. Once cooked, and removed from the smokehouse, the emulsion is cooled, also referred to as tempered. The mold is subsequently opened and the ham extracted.

This molding process successfully produces a flavorful, cooked food product such as a ham. However, in the extraction process, where the two portions of the mold are separated, the process is very labor intensive and somewhat dangerous. It is necessary for personnel to unlatch the two halves of the mold and attempt to separate them by hand without damaging the food product. This generally requires that the extractor invert the mold and impact it. When the latches are disengaged they may hit the personnel. After this the personnel must try to remove the pan upwardly from the lid. This process has some degree of success, but again, it requires considerable manpower. Also, mishandling of the mold with the food product still in it can result in damage to the food product. Such damage ruins it for sale.

The present invention solves this problem by providing an apparatus which automatically opens the mold, extracts the food product therefrom, normally by gravity. The invention includes mechanical means to engage and pull the lid from the pan should the lid become stuck or lodged in the pan.

SUMMARY OF THE INVENTION

The present invention is a mold opening and food product extracting apparatus which is used to automatically unlatch the components of a food product mold and to extract the molded food product from within the mold. Typically, the molds have a first mold portion or lid and a second mold portion or pan which are latched together by spring-loaded latches.

The apparatus of the present invention comprises a conveyor for receiving a latched mold thereon with a food product therein and adapted for moving the mold, and further comprising a delatcher adjacent to the conveyor. The delatcher comprises a mold engagement means for engaging the first portion of the mold, and a mold support for supporting the second mold portion when the first mold portion is engaged by the mold engagement means. The second mold portion is held substantially stationary against the mold support while the first mold portion is moved toward the second mold portion such that the first and second mold portions are unlatched from one another. In the preferred embodiment, the mold engagement means is a hydraulic or pneumatic cylinder having a piston with an extended position for engaging the first portion of the mold and a retracted position spaced away from the first portion of the mold. The mold is preferably positioned on the conveyor in an inverted position such that the first mold portion is below the second mold portion. The mold engagement means or cylinder is adapted for contacting the first mold portion from below. The mold support is preferably characterized as a strap positioned above the second mold portion.

In a preferred embodiment, an electric eye is disposed adjacent to the delatcher, and the electric eye projects a light beam therefrom. The mold engagement means is adapted for engaging the first portion of the mold when the mold breaks the light beam as the mold is moved along the conveyor through the delatcher. The electric eye is connected to a control circuit which send a signal actuating the mold engagement means or leaving it unactuated if the signal is not sent.

In a preferred embodiment, the conveyor is a first conveyor, and the apparatus further comprises a second conveyor disposed above at least a portion of the first conveyor, and mold gripping means on the second conveyor for grippingly engaging the second mold portion and moving the second mold portion therealong. The second mold portion is thus raised above, and thereby separated from, the first mold portion. The second conveyor comprises a pair of conveyor belts having facing surfaces thereon which are vertically disposed. This pair of conveyor belts rotates in opposite directions. The mold gripping means may be characterized by a plurality of gripper pads disposed on the surfaces of the conveyor belts, and it is these gripper pads which preferably grip the second mold portion as it is moved by the second conveyor.

The apparatus may further comprise a staging gate adjacent to the first conveyor, wherein the staging gate is selectively actuable between a closed position wherein molds are prevented from moving on the first conveyor and an open position wherein molds are allowed to move on the first conveyor. A microswitch and another electric eye, connected by a control circuit to a cylinder which actuates the staging gate, is positioned adjacent to the delatcher. The electric eye projects a light beam therefrom. The staging gate is actuated to the position thereof when a mold moving along the conveyor contacts the microswitch. The staging gate is closed after a time delay. When a mold breaks this other light beam the function of the microswitch is prevented. In one embodiment, the light beam is projected angularly across the first conveyor such that a point at which the mold first breaks the light beam as it moves along the conveyor is longitudinally spaced from a point at which the mold is no longer breaking the light beam. The light beam is projected at least partially through the delatcher.

The apparatus may also further comprise a delay gate adjacent to the first conveyor and near the entry side of the second conveyor. The delay gate is selectively actuable between a closed position wherein molds which have been delatched in the delatcher are prevented from movement on the first conveyor and an open position wherein molds are allowed to move on the first conveyor toward the second conveyor.

In one embodiment, a microswitch is disposed adjacent to the delay gate such that, as the conveyor moves a mold through the delay gate, the mold contacts the microswitch and, through a control circuit, actuates a cylinder connected to the delay gate. Thus, the delay gate is actuated to a closed position thereof. The microswitch also initiates a time delay in the control circuit, and after the time has run, the delay gate is again actuated to its open position.

In the apparatus thus far described, the first mold portion and the food product are normally separated from the second mold portion by gravity. However, in the event that the first mold portion does not separate properly from the second mold portion by gravity, the apparatus may additionally comprise a puller device, also called a lid puller, for engaging the first mold portion or lid and pulling the first mold portion downwardly away from the second mold portion. The lid puller comprises a main cylinder adjacent to the first conveyor and actuable between extended and retracted positions thereof, a rod connected to the main cylinder and movable therewith, and a side cylinder attached to the rod and movable therewith when the main cylinder is actuated between the extended and retracted positions thereof. The side cylinder is actuable between engaging and disengaging positions thereof. The lid puller also comprises a clamp attached to the side cylinder and movable therewith such that, when the main cylinder is in the extended position, the side cylinder may be moved to the engaging position such that the clamp is engaged with the first mold portion, after which the main cylinder is moved to the retracted position thereof such that the first mold portion, engaged by the clamp, is pulled away from the second mold portion. In one embodiment, the rod is one of a pair of rods disposed on opposite sides of the first conveyor, and the side cylinder is one of a pair of side cylinders, each side cylinder being attached to an end of one of the rods and having a clamp thereon. Actuation of the lid puller is controlled by actuation of a microswitch adjacent to the second conveyor, and the microswitch is actuated when engaged by a mold moving along the second conveyor.

Along with the lid puller, the apparatus may still further comprise a weight sensing means for sensing when the first mold portion and the food product are properly separated from the second mold portion by gravity. The weight sensing means preferably comprises a pivot gate attached to the first conveyor, said pivot gate being pivotable between the weight sensing position and the non-weight sensing position, and a counterweight attached to the pivot gate and adapted for biasing the pivot gate toward the non-weight sensing position. When pivoted pivot gate engages another microswitch prevents the functioning of the microswitch controlling the lid puller when weight is sensed.

The present invention provides a mold opening apparatus for opening a multi-piece food mold and extracting a food product therefrom. The apparatus saves considerable labor time and personal injury over manual extraction and further provides more consistent extraction of the food product while minimizing mishandling and the resultant damaged product.

Numerous objects and advantages of the invention will become apparent as the following detailed description of the preferred embodiment is read in conjunction with the drawings illustrating such embodiment.

BRIEF DESCRIPTION OF THE DRAWINGS

FIGS. 3A and 3B show a side elevational view of the food product mold opening apparatus of the present invention.

DESCRIPTION OF THE PREFERRED EMBODIMENT

Figure 1:
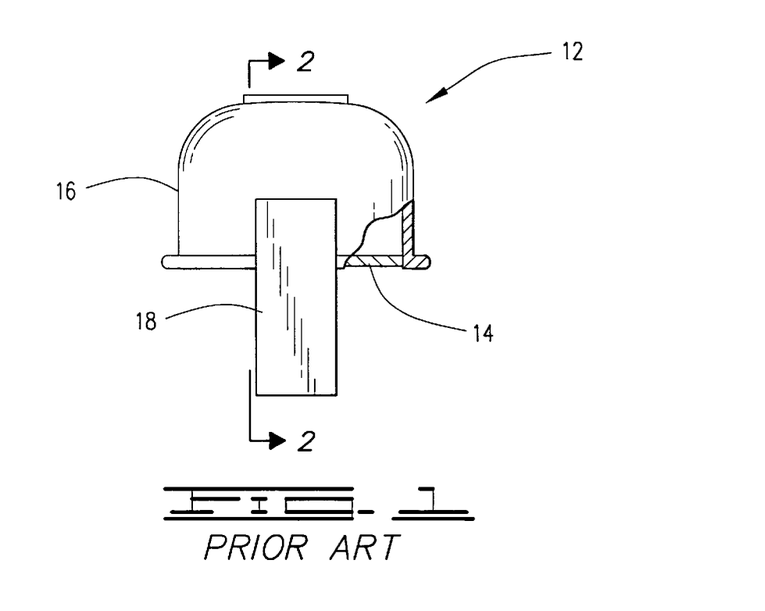
FIG. 1 shows an end view of a prior art mold for a food product.
Figure 2:
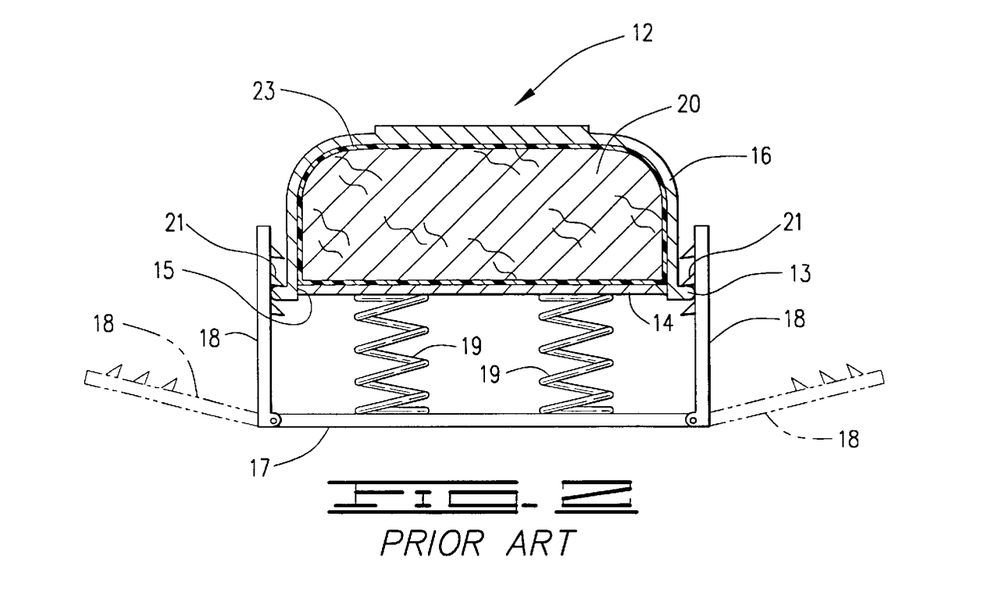
FIG. 2 is a cross-section taken along lines 2—2 in FIG. 1.

Referring now to the drawings, the mold opening and food product extraction apparatus of the present invention is shown and generally designated by the numeral 10. Apparatus 10 is used to open a latchable mold 12 of the type used for molding food products. Details of mold 12 are shown in FIGS. 1 and 2.

Typically, mold 12 will have a first mold portion 14, also referred to as a lid 14, and a second mold portion 16, also referred to as main mold portion or pan 16. Molds 12 are of a kind known in the art such as an Adelman stainless steel mold used for preparing honey hams. Pan 16 has an outer lip 13 thereon at an end of the pan defining an opening 15. Lid 14 is sized to fit within opening 15, as best seen in FIG. 2. A handle 17 is attached to lid 14 by a plurality of springs 19. Thus, handle 17 and springs 19 may be considered part of the first mold portion or lid 14.

A latch 18 is pivotally connected to each end of handle 17. Latches 18 are pivoted between a latched position in which one of a plurality of teeth 21 on each latch 18 is positioned over a portion of lip 13 and an unlatched position. When in the latched position, springs 19 bias handle 17 away from lid 14 such that teeth 21 are maintained in engagement with lips 13. As will be further described herein, if handle 17 is moved toward lip 13, compressing springs 19, the engaged teeth 21 will be pushed away from lips 13 so that latches 18 are free to move to the unlatched position. The taper of the next tooth 21 contacts the lower side of lip 13 which tends to pivot latch 18 away from pan 16 as lid 14 is moved toward pan 16. The latched position is shown in solid lines in FIG. 2, and the unlatched position in phantom lines.

A food product emulsion 20 comprising a combination of different mussels, brines and/or other materials, of a kind known in the art, is prepared and sealed in a plastic bag 23 which is inserted into mold 12. Mold 12 with bag 23 and emulsion 20 therein is placed in a smokehouse in which the emulsion is cooked. Once cooked, the emulsion is cooled or tempered, after which it is ready for extraction of the food product in apparatus 10.

Figure 4:
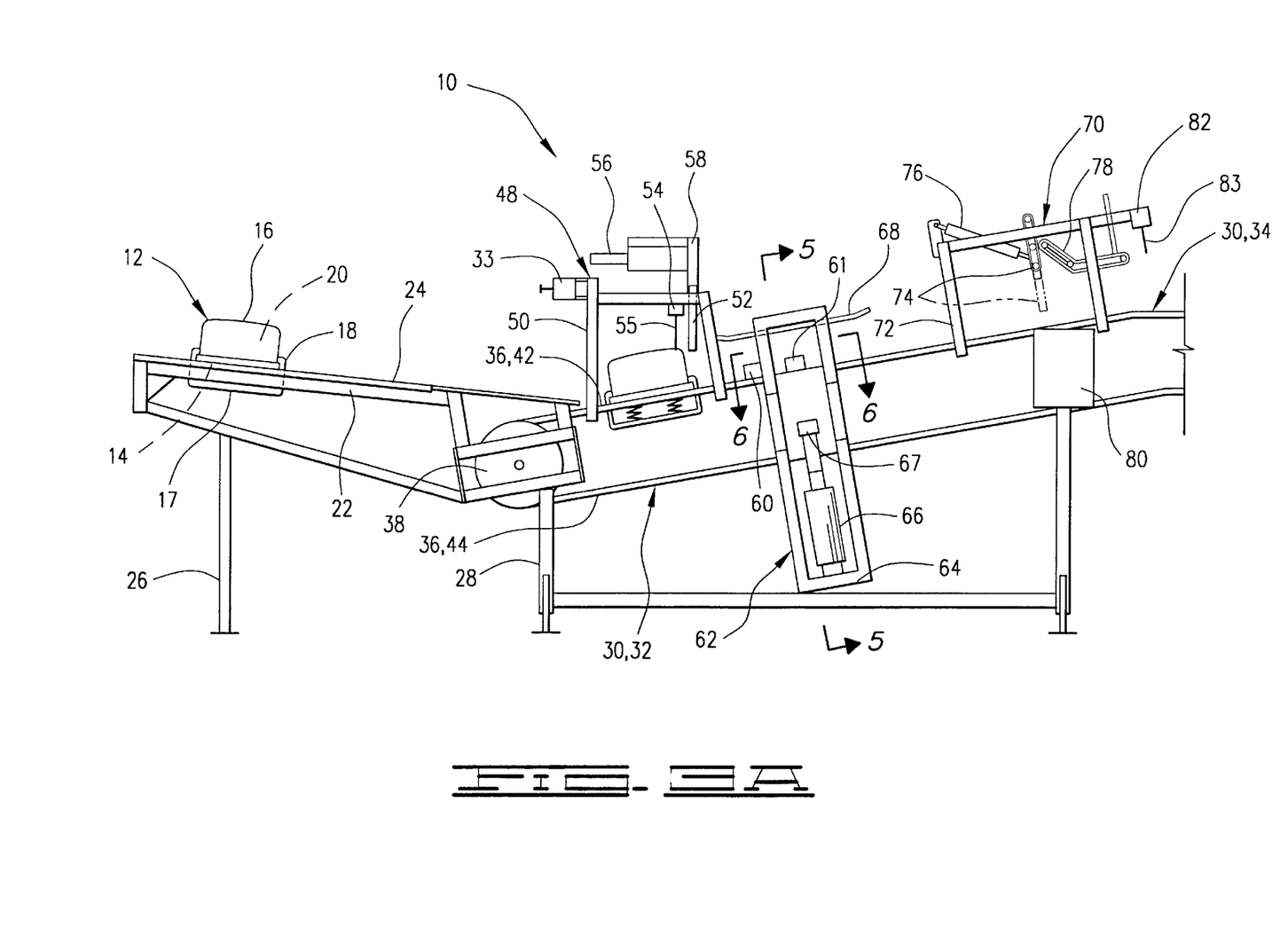
FIGS. 4A and 4B illustrate a plan view of the apparatus.
Figure 4A:
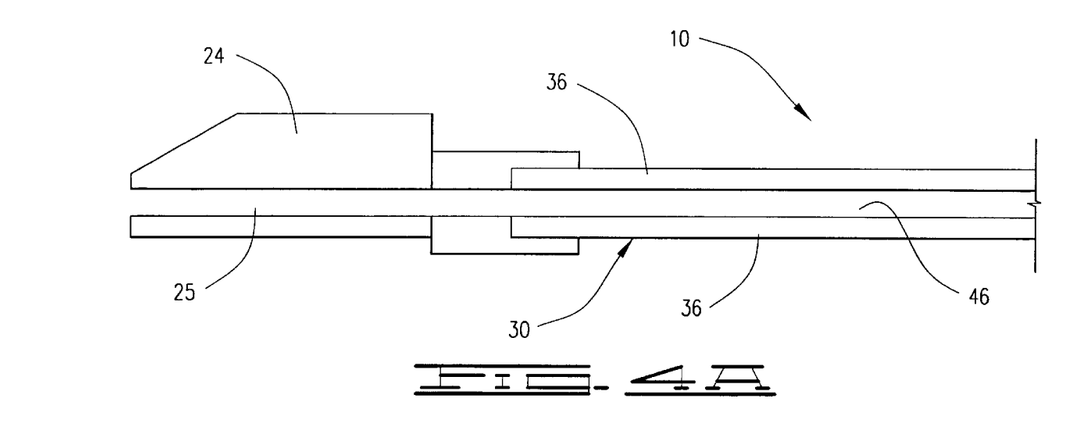

Upon removal of mold 12 with emulsion 20 therein from the smokehouse, an operator of apparatus 10 turns the mold so that lid 14 is positioned downwardly, and pan 16 of the mold extends upwardly. Referring now to FIGS. 3A, 3B, 4A and 4B, inverted mold 12 is placed on a feed table 22 which preferably has a plastic cutting board slide 24 forming the top surface thereof. Cutting board slide 24 defines a longitudinally extending slot 25 therein as best seen in FIG. 4A. Slot 25 is sized to be wide enough to allow handle 17 and latches 18 of mold 12 to pass therethrough but is too narrow for lid 14 or pan 16 of the mold to pass therethrough. Thus, handles 17 and latches 18 of molds 12 extend downwardly through slot 25. This is illustrated in FIG. 3A.

Feed table 22 is supported by a leg 26 and a frame portion 28 of a first conveyor 30 such that cutting board slide 24 slants downwardly toward the first conveyor. First conveyor 30 is operated through controls 31 and 33. This allows control at either end of apparatus 10.

First conveyor 30 has an upwardly angled conveyor portion 32 at the entry end thereof and a substantially horizontal conveyor portion 34 at the discharge end thereof. Upward conveyor portion is supported on frame portion 28, and horizontal conveyor portion is supported on another frame portion 35. Actually, frame portions 28 and 35 are components of an overall support structure some of which is omitted for clarity in the drawings.

First conveyor 30 has a pair of substantially parallel conveyor belts 36 movably mounted on pulleys 38 and 40 at opposite ends thereof. Pulleys 38 and 40 are rotated clockwise as seen in FIGS. 3A and 3B by a prime mover (not shown) such that an upper portion 42 of belts 36 thereof moves to the right as seen in FIGS. 3A and 3B, and a lower portion 44 moves to the left as seen in FIGS. 3A and 3B.

Figure 4B:
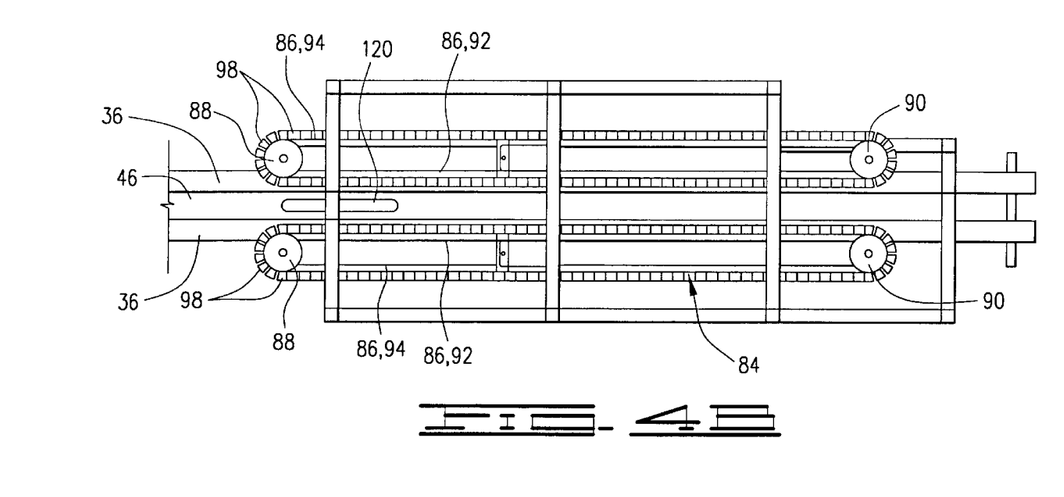

The two conveyor belts 36, best seen in FIGS. 4A and 4B, define a longitudinal gap 46 therebetween. Gap 46 is substantially the same width as slot 25 in cutting board slide 24 and is aligned therewith, as seen in FIG. 4A. Thus, gap 46 is also wide enough to allow handle 17 and latches 18 of each mold 12 to pass therethrough but is too narrow for lid 14 or pan 16 of the mold to pass therethrough. Thus, as seen in FIG. 3A, handles 17 and latches 18 extend through gap 46 partially downwardly from upper portions 42 of conveyor belts 36.

A staging gate assembly 48 is disposed above conveyor belts 36 near feed table 22. Staging gate assembly 48 has a frame 50 on which is slidably mounted a gate 52. A microswitch 54 with a lever 55 is disposed in staging gate assembly 48. Microswitch 54 is actuated by the engagement of molds 12 with lever 55. Gate 52 is selectively raised and lowered between a closed position (shown in FIG. 3A) adjacent to conveyor belts 36, such that movement of molds 12 along conveyor belts 36 is prevented, and an open position spaced further above conveyor belts 36 which allows molds 12 to pass under gate 52. Gate 52 is activated between these open and closed positions by a hydraulic or pneumatic cylinder 56 connected to gate 52 by a linkage 58. Operation of staging gate assembly 48 is controlled by microswitch 54 and an electric eye 60 which senses movement of molds 12 into a delatcher 62 as will be further described herein.

Figure 5:
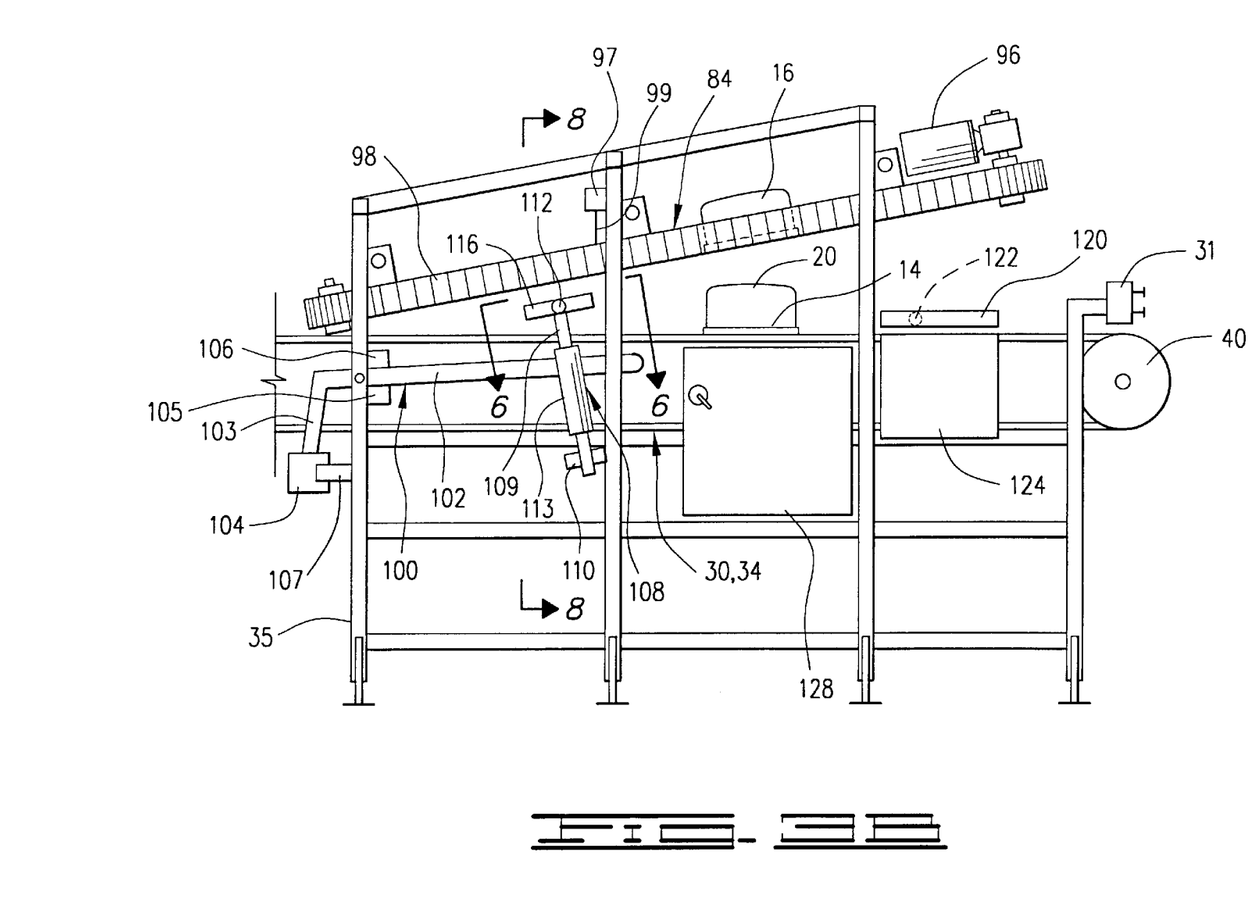
FIG. 5 shows a cross-section taken along lines 5—5 in FIG. 3A.

Delatcher 62 is positioned adjacent to starting gate assembly 48 on an opposite side thereof from feed table 22. Delatcher 62 comprises a frame 64 with a hydraulic or pneumatic cylinder 66 disposed thereon at a location below upper portion 42 of conveyor belts 36. Cylinder 66 has an end 67 thereon. A rigid mold support or strap 68 extends longitudinally above a portion of gap 46 between conveyor belts 36. Strap 68 is attached to frame 64 of delatcher 62 and extends from staging gate assembly 48 past frame 64. See also FIG. 5. Actuation of cylinder 66 is controlled by an electric eye 61.

Figure 6:
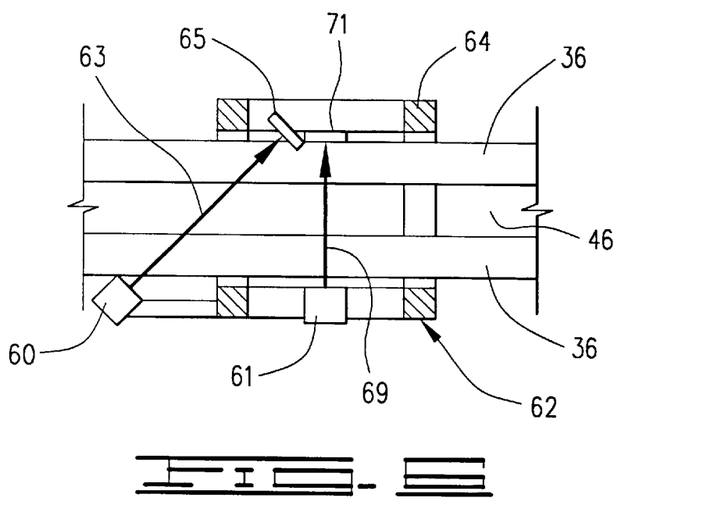
FIG. 6 shows a cross-section taken along lines 6—6 in FIG. 3A.

Referring now to FIG. 6, the arrangement of electric eyes 60 and 61 with respect to delatcher 62 is shown. Electric eye 60 is angularly positioned to direct a light beam 63 against a reflector 65. Electric eye 61 is positioned to direct a light beam 69 laterally across delatcher 62 to a reflector 71. Electric eyes 60 and 61 sense when a mold 12 breaks light beams 63 and 69, respectively, as will be further described herein.

Electric eyes 60 and 61 are connected to control circuitry in a control panel 80. This control circuitry uses conventional components.

A time-delay gate assembly 70 is positioned above conveyor belts 36 at a location further up the slope of upwardly extending conveyor portion 32. That is, delay gate assembly 70 is positioned on an opposite side of delatcher 62 from staging gate assembly 48. Delay gate assembly 70 has a frame 72 with a delay gate 74 slidably disposed thereon. Gate 74 is movable between a closed position adjacent to upper portion 42 of conveyor belts 36 wherein movement of molds 12 is prevented and an open position under which molds 12 may move. The open position is shown in solid lines in FIG. 3A, and the closed position is shown in phantom lines. Delay gate 74 is actuated by a hydraulic or pneumatic cylinder 76 through a linkage 78 which innerconnects cylinder 76 and delay gate 74. Control of cylinder 76 is by a microswitch 82 which is actuated by the contact of molds 12 with lever 83 of the microswitch. Microswitch 82 is also connected to a time delay in the circuitry in control panel 80.

A second conveyor 84 is disposed above horizontal conveyor portion 34 and angles upwardly from a position adjacent to upward conveyor portion 32 toward the end of first conveyor 30 above pulley 40. As best seen in FIG. 4B, second conveyor 84 includes a pair of conveyor belts 86 which rotate in the same plane about pulleys 88 and 90 such that the facing surfaces of belts 86 are substantially vertical. Conveyor belts 86 rotate in opposite directions so that inner, facing portions 92 thereof move from left to right as seen in FIG. 4B, and outer portions 94 move from right to left. It will thus be seen that inner portions 92 of conveyor belts 86 on second conveyor 84 move in the same direction as upper portions 42 of conveyor belts 36 of first conveyor 30. Second conveyor 84 is powered by one or more motors 96.

Each of conveyor belts 86 has a plurality of corresponding gripper pads 98 attached thereto. Gripper pads 98 are closely spaced and are adapted to grippingly engage pans 16 of molds 12 when the molds enter second conveyor 84 as the molds reach horizontal conveyor portion 34 of first conveyor 30, as will be further described herein.

A microswitch 97 having a lever 99 is disposed above second conveyor 84.

A pivot gate assembly 100 is disposed below upper portion 42 of conveyor belts 36 at the beginning portion of horizontal conveyor portion 34. Pivot gate assembly 100 includes a pivot gate 102 pivotally attached to frame portion 35. A microswitch 105 is disposed below pivot gate 102 and is adapted for actuation thereby when pivot gate 102 is pivoted as will be further described herein. A rod 103 extends downwardly from an end of pivot gate 102, and a counter-weight 104 is attached to the lower end of rod 103. The other end of the pivot gate is free and extends upwardly toward belts 36. Counter-weight 104 biases pivot gate 102 in a counterclockwise direction as seen in FIG. 3B. A stop 106 prevents over-rotation of pivot gate 102. Another stop 107 prevents over-rotation of counter-weight 104. If stop 107 were not present, weight 104 could provide too much torque on pivot gate 102 which might cause damage when the pivot gate contacts stop 106.

Figure 7:
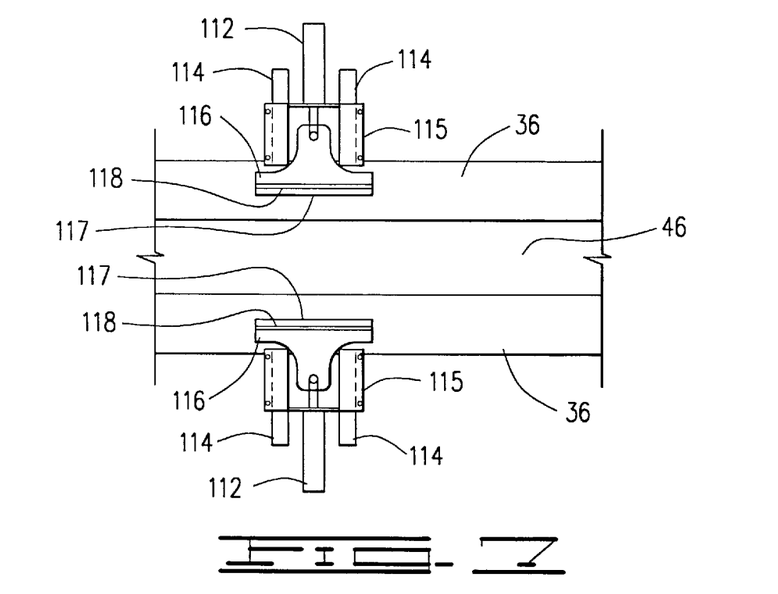
FIG. 7 is a cross-section taken along lines 7—7 in FIG. 3B.
Figure 8:
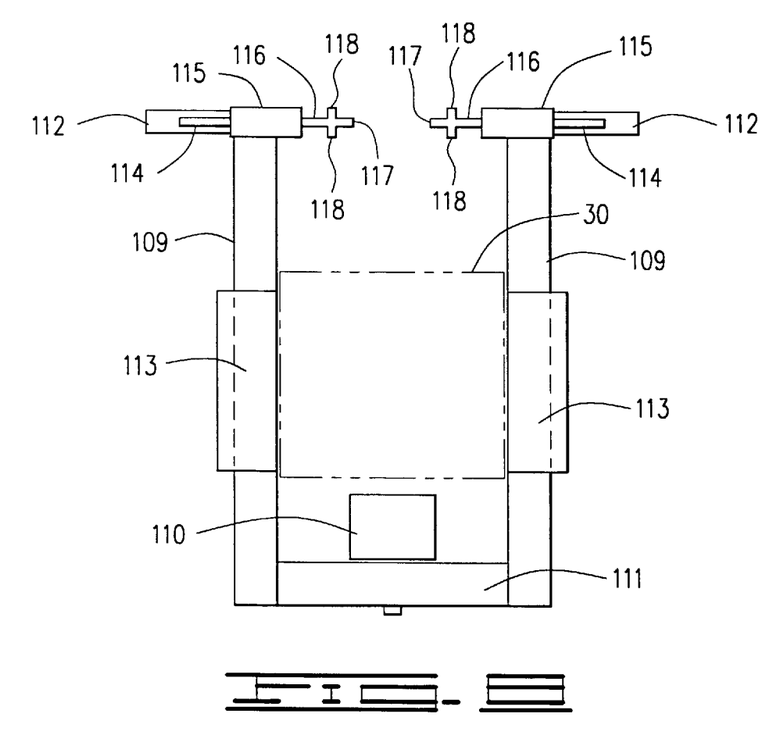
FIG. 8 is a view taken along lines 8—8 in FIG. 3B.

Referring to FIGS. 3B, 7 and 8, a puller device 108, also referred to as lid puller 108, is disposed adjacent to first conveyor 30 and below second conveyor 84. Lid puller 108 comprises a transversely spaced pair of upwardly oriented rods 109 disposed on opposite sides of first conveyor 30. Rods 109 are connected at lower ends thereof by a bar 111. A hydraulic or pneumatic cylinder 110 is attached to bar 111. Actuation of cylinder 110 results in selective upward and downward movement of bar 111 and rods 109. Rods 109 are guided through a pair of bearings 113, preferably made of a self-lubricating material such a plastic. At the top of each of rods 109 is a horizontally disposed hydraulic or pneumatic side cylinder 112. Side cylinders 112 also extend transversally with respect to first conveyor 30 and second conveyor 86. Side cylinders 112 have facing clamps 116 thereon which may be moved toward and away from one another by actuation of side cylinders 112. Clamps 116 may be moved toward and away from second conveyor 84 by actuating main cylinder 110 between extended and retracted positions thereof, respectively.

Clamps 116 have a pair of guides 114 extending therefrom. Guides 114 extend through a bearing 115 which is attached to frame portion 35.

As best seen in FIG. 8, clamps 116 have a horizontally extending lip 117 thereon with upwardly and downwardly extending flanges 118. As will be further described herein, lip 117 is adapted for engaging springs 19 on first portion or lid 14 of molds 12. Flanges 118 prevent lips 117 from extending too far into springs 19 so that clamps 116 do not become tangled in the springs.

At an end of horizontal conveyor portion 34 of first conveyor 30 is a food product slide 120 which is actuated in a transverse direction by a side cylinder 122.

Operation of first conveyor 30 and second conveyor 34 is maintained through conveyor controls 124. An overall electrical control panel 128 is also shown in FIG. 3B.

OPERATION OF THE INVENTION

As previously mentioned, after molds 12 with cooked emulsions 20 therein are removed from the smokehouse, the molds are positioned on feed table 22 in an inverted position with a lid 14 on the bottom, extending into slot 25 and pan 16 of the corresponding mold 12 on the top. The operator sets molds 12 on cutting board slide 24 so that they slide toward staging gate assembly 48 and first conveyor 30.

Slot 25 guides molds 12 such that lips 13 of pans 16 thereof engage conveyor belts 36. Each mold 12 will be moved upwardly along upward conveyor portion 32 with handles 17 and latches 18 extending below upper portion 42 of conveyor belts 36.

Apparatus 10 is started using either control 30 or 31 and may be stopped by either as well. Starting apparatus 10 starts first conveyor 30 and second conveyor 84 moving.

Figure 9:
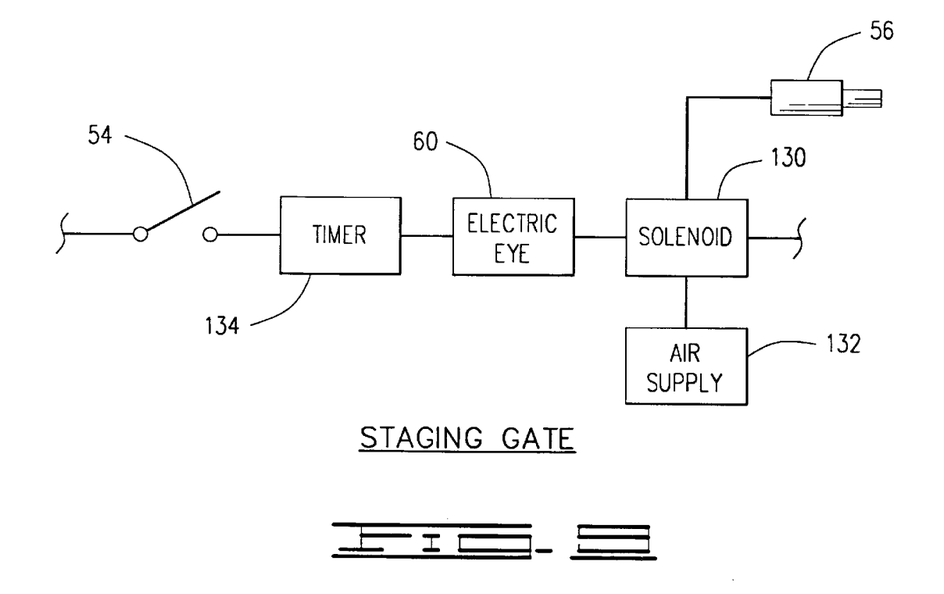
FIG. 9 shows a schematic of the control circuit for the staging gate.

As molds 12 engage and then move along first conveyor 30, the molds enter staging gate assembly 48. When staging gate 52 is closed, no molds may move along first conveyor 30. That is, conveyor belts 36 slide along under any mold 12 which is prevented from moving by staging gate assembly 48. Pneumatic cylinder 56 of staging gate assembly 48 is actuated by a solenoid 130 connected to an air supply 132 when a mold 12 contacts lever 55 of microswitch 54. See FIG. 9. When this occurs, a timer 134 in control panel 80 is triggered. After the time runs, cylinder 56 is deactivated, allowing staging gate 52 to drop down and ride on pan 16 of mold 12. Staging gate 52 drops directly behind mold 12, preventing the next mold to pass through.

Mold 12 enters delatcher 62, where the mold breaks light beam 63 projected by electric eye 60. When light beam 63 is thus broken, the function of microswitch 54 is stopped. That is, during this time, microswitch 54 cannot open staging gate 52, even if a mold 12 contacts lever 55.

Light beam 63 remains interrupted by the mold passing through delatcher 62 until the rear end of the mold passes near reflector 65. This angular relationship of electric eye 60 provides extra spacing between molds leaving staging gate assembly 48 and entering delatcher 62.

Figure 10:
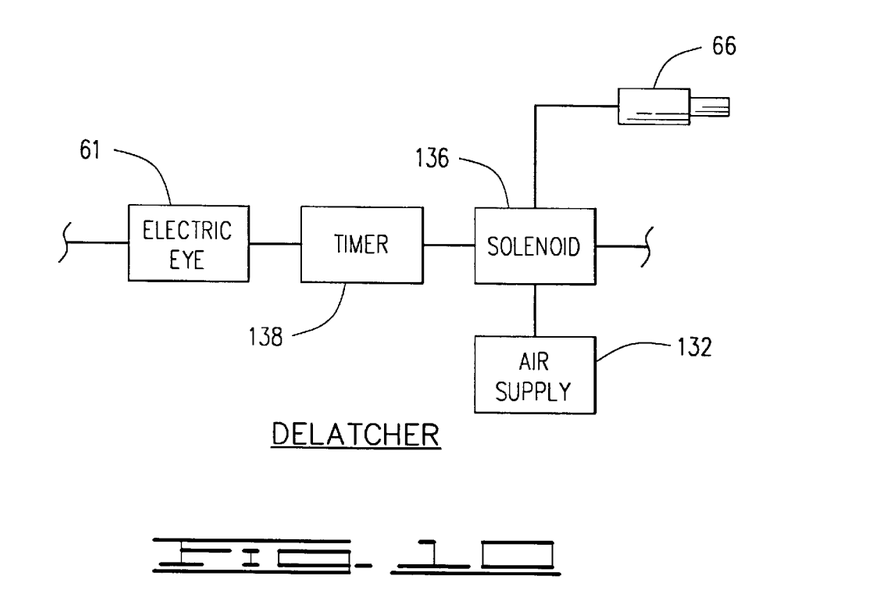
FIG. 10 is a schematic of the control circuit for the delatcher.

As mold 12 moves further into delatcher 62, the mold breaks light beam 69 which actuates pneumatic cylinder 66 by connecting it to air supply 132 by a solenoid 136 so that end 67 of cylinder 66 is extended to engage handle 17 of the corresponding mold 12. See FIG. 10. Thus, a mold engagement means is provided. This actuation causes mold 12 to move upwardly until pan 16 thereof contacts strap 68. Further force applied by pneumatic cylinder 66 pushes lid 14 of mold 12 toward pan 16, compressing spring 19. This releases latches 18 as previously described so that lid 14 and pan 16 are no longer latched together. Cylinder 66 is then retracted after the time delay runs in timer 138 so that the unlatched mold 12 is free to move further upwardly along upward conveyor portion 32 of first conveyor 30.

Figure 11:
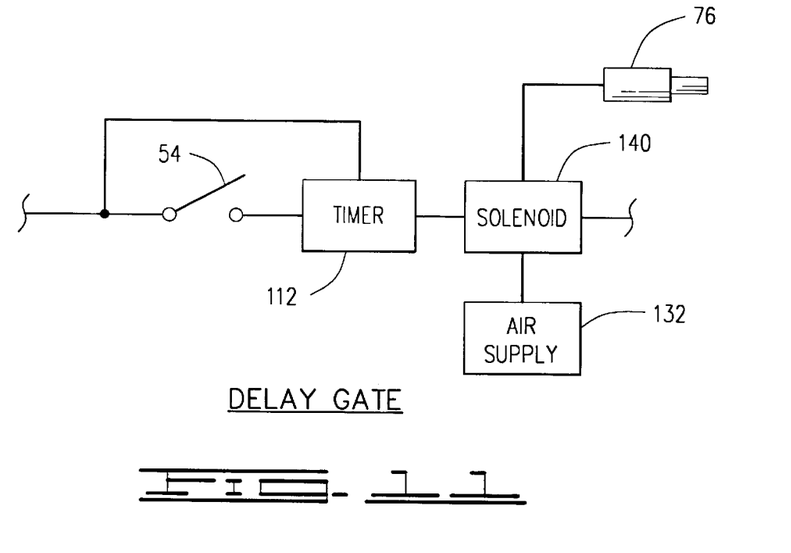
FIG. 11 presents a control circuit schematic for the delay gate.

As the molds move upwardly on first conveyor 30 and approach second conveyor 84, it is again desirable that the movement of molds 12 be controlled such that the molds enter second conveyor 84 at the desired spacing. To accomplish this, delay gate 74 of delay gate assembly 70 is utilized. As a mold 12 exits delay gate assembly 70, the mold contacts lever 83 of microswitch 82. When this occurs, cylinder 76 is actuated by a solenoid 140 connected to an air supply 132 to close delay gate 74 so that movement of molds through delay gate assembly 70 is temporarily prevented. See FIG. 11. Actuation of microswitch 32 also initiates a timer 142 in the circuit within control panel 80 which is set at a predetermined time interval. Once this time interval has passed, cylinder 76 is again actuated to open delay gate 74.

Because of the transverse spacing between conveyor belts 86, gripper pads 98 only grippingly engage pan 16 of each mold 12. It will be seen that the movement of mold 12 upwardly along second conveyor 84 will cause pan 16 to be raised above horizontal conveyor portion 34 of first conveyor 30. Thus, a mold gripping means is provided.

Figure 12:
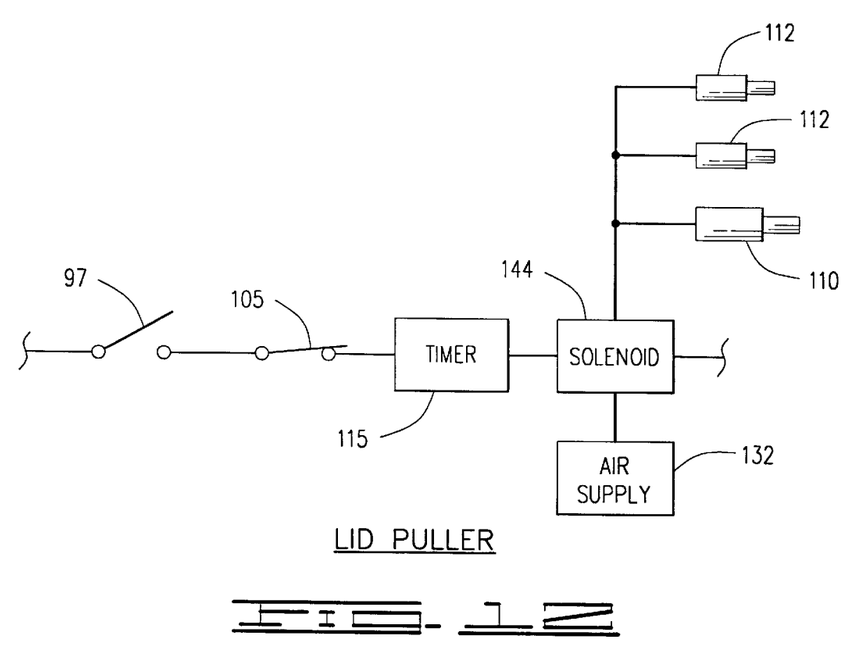
FIG. 12 shows a schematic of the control circuit for the lid puller.

Ideally, the weight of cooked food product 20 and first portion or lid 14 of mold 12 will be such that the food product and the lid will be separated from second or portion or pan 16 of mold 12 by gravity. When this occurs, the food product and lid 14 preferably will remain on, or will fall onto, horizontal conveyor portion 34 of first conveyor 30. Assuming that this occurs, handle 17 of mold 12 still extends into gap 46 and engages pivot gate 102 so that counterweight 104 is moved away from stop 107 and microswitch 105 is actuated to an open position. Thus, proper separation of lid 14 and the food product from pan 16 is sensed by pivot gate 102 and microswitch 105. The opening of microswitch 105 prevents actuation of pneumatic cylinders 110 and 112 on lid puller 108 because the separation has been properly carried out. See FIG. 12. That is, microswitch 105 is part of the circuit controlling cylinders 110 and 112.

However, if a lid 14 sticks or is otherwise lodged in pan 16 of mold 12, there will be no actuation of pivot gate 102, and microswitch 105 will remain closed. Accordingly, complete mold 12 and food product 20 will be moved upwardly along second conveyor 84. If this occurs, lid puller 108 is actuated by the engagement of mold 12 with lever 99 of microswitch 97. That is, side cylinders 112 are actuated by a solenoid 144 connected to air supply 132 so that clamps 116 close toward one another. Clamps 116 are thus caused to be engaged with springs 19, as previously described. Main cylinder 110 is also actuated by solenoid 144 so that springs 19, and thus lid 14 and handle 17, are pulled downwardly away from pan 16 of the mold. Main cylinder 110 is actuated a short time after cylinders 112. Cylinders 112 actuate more quickly because they are smaller than main cylinder 110 and thus take less air. As lid 14 is thus pulled down, the corresponding food product 20 will fall downwardly from shell 16. Microswitch 97 also triggers a timer 150 in the circuit in control panel 80 which controls how long cylinder 110 and cylinders 112 are actuated, thus limiting how far cylinder 110 moves so that lid 14 is not pulled down too far. Side cylinders 112 are then retracted to move clamps 116 apart so that lid 14 is released. Cylinder 110 returns to its original position. None of this can occur if microswitch 105 has been opened by pivot gate 102.

Regardless of whether the separation of mold 12 and extraction of food product 20 is carried out by gravity or by actuation of mold puller 108, the food product and lid 14 are moved along horizontal conveyor portion 34 of first conveyor 30 until they are aligned with food product slide 120. At this point, transverse cylinder 122 is actuated to push food product slide 120 into engagement with food product 20 on lid 14 such that the food product is pushed laterally off of the lid and onto table 124. Food product 20 is then transferred to another area, such as a packaging area.

As second portion 16 of molds 12 reach the end of second conveyor 84, they will fall into a chute leading to a container (not shown) in which they may be transported to a washing area. Similarly, lids 14 will fall off of the end of first conveyor 30, after which they are also transported to the washing area.

At any time, first conveyor 30 and second conveyor 84 may be shut down by control 31 and 33. All electrical power to apparatus 10 is controlled by electrical control panel 128.

It will be seen, therefore, that the mold opening and food product extraction apparatus of the present invention is well adapted to carry out the ends and advantages mentioned as well as those inherent therein. While a presently preferred embodiment of the apparatus has been shown for the purposes of this disclosure, numerous changes in the arrangement and construction of parts may be made by those skilled in the art. All such changes are encompassed within the scope and spirit of the appended claims.

What is claimed is:

1. An apparatus for opening a food product mold, having a first mold portion and a second mold portion which can be latched together, said apparatus comprising:
    a conveyor for receiving a latched mold thereon with a food product in the mold and for moving the mold;
    a delatcher adjacent to said conveyor and comprising:
        a mold engagement means for engaging the first portion of the mold; and
        a mold support for supporting the second mold portion when the first mold portion is engaged by said mold engagement means;
        wherein, the first mold portion is held substantially stationary against the mold support while the first mold portion is moved toward the second mold portion such that the first and second mold portions are unlatched from one another; and
    a staging gate adjacent to said conveyor, said staging gate being selectively actuable between a closed position wherein molds are prevented from moving on said conveyor to said delatcher and an open position wherein molds are allowed to move on said conveyor.

2. An apparatus for opening a food product mold, having a first mold portion and a second mold portion which can be latched together, said apparatus comprising:
    a conveyor for receiving a latched mold thereon with a food product in the mold and for moving the mold, wherein the mold is positioned on said conveyor in an inverted position such that the first mold portion is below the second mold portion; and
    a delatcher adjacent to said conveyor comprising:
        a mold engagement means for engaging the first portion of the mold from below; and
        a mold support for supporting the second mold portion when the first mold portion is engaged by said mold engagement means;
        wherein, the second mold portion is held substantially stationary against the mold support while the first mold portion is moved toward the second mold portion such that the first and second mold portions are unlatched from one another.

3. The apparatus of claim 2 wherein said mold support is a strap positioned above the second mold portion.

4. The apparatus of claim 2 wherein the first mold portion and the food product are normally separated from the second mold portion by gravity.

5. The apparatus of claim 4 further comprising a puller device for engaging the first mold portion and pulling the first mold portion away from the second mold portion in the event that the first mold portion does not separate properly from the second mold portion by gravity.

6. The apparatus of claim 5 wherein said puller device comprises:
    a main cylinder adjacent to said first conveyor and actuable between extended and retracted positions thereof;
    a rod connected to said main cylinder and moveable therewith;
    a side cylinder attached to said rod and movable therewith when said main cylinder is actuated between said extended and retracted positions thereof, said side cylinder being actuable between engaging and disengaging positions thereof; and
    a clamp attached to said side cylinder and movable therewith;
    wherein, when said main cylinder is in said extended position, said side cylinder may be moved to the engaging position such that said clamp is engaged with the first mold portion, after which said main cylinder is moved to the retracted position thereof such that the first mold portion, engaged by said clamp, is pulled away from the second mold portion.

7. The apparatus of claim 6 wherein:
    said rod is one of a pair of rods disposed on opposite sides of said conveyor; and
    said side cylinder is one of a pair of side cylinders, each side cylinder being attached to an end of one of said rods.

8. The apparatus of claim 2 wherein said conveyor comprises a pair of spaced conveyor belts defining a gap therebetween;
    wherein, said gap is sized to receive a part of said first mold portion therethrough.

9. An apparatus for opening a food product mold, having a first mold portion and a second mold portion which can be latched together, said apparatus comprising:
    a conveyor for receiving a latched mold portion thereon with a food product in the mold and for moving the mold;
    a delatcher adjacent to said conveyor and comprising:
        a mold engagement means for engaging the first portion of the mold; and
        a mold support for supporting the second mold portion when the first mold portion is engaged by said mold engagement means;
        wherein, the second mold portion is held substantially stationary against the mold support while the first mold portion is moved toward the second mold portion such that the first and second mold portions are unlatched from one another; and an electric eye disposed adjacent to said delatcher, said electric eye projecting a light beam therefrom;

of said mold wherein, said mold engagement means is adapted for engaging said first portion of said mold when said mold breaks said light beam as said mold is moved along said conveyor.

10. An apparatus for opening a food product mold, having a first mold portion and a second mold portion which can be latched together, said apparatus comprising:

a first conveyor for receiving a latched mold therein with a food product in the mold and for moving the mold;

a delatcher adjacent to said first conveyor and comprising:
a mold engagement means for engaging the first portion of the mold; and
a mold support for engaging the second mold portion when the first mold portion is engaged by said mold engagement means;
wherein, the second mold portion is held substantially stationary against the mold support while the first mold portion is moved toward the second mold portion such that the first and second mold portions are unlatched from one another;

a second conveyor disposed above at least a portion of said first conveyor; and mold gripping means on said second conveyor for grippingly engaging the second mold portion and moving the second mold portion therealong, such that the second mold portion is raised above, and thereby separated from, the first mold portion.

11. The apparatus of claim 10 wherein said second conveyor comprises:
a pair of conveyor belts having facing surfaces thereon which are substantially vertically disposed, said pair of conveyor belts rotating in opposite directions.

12. An apparatus for opening a food product mold, having a first mold portion and a second mold portion which can be latched together, said apparatus comprising:

a conveyor for receiving a latched mold thereon with a food product in the mold and for moving the mold;

a delatcher adjacent to said conveyor and comprising:
a mold engagement means for engaging the first portion of the mold; and
a mold support for supporting the second mold portion when the first mold portion is engaged by said mold engagement means;
wherein, the second mold portion is held substantially stationary against the mold support while the first mold portion is moved toward the second mold portion such that the first and second mold portions are unlatched from one another;

a staging gate adjacent to said conveyor, said staging gate being selectively actuable between a closed position wherein molds are prevented from moving on said conveyor and an open position wherein molds are allowed to move on said conveyor; and an electric eye projecting a light beam therefrom;

wherein, said staging gate is adapted for being actuated to said closed position when a mold moving along said conveyor breaks said light beam and being actuated to said open position when the mold is no longer breaking said light beam.

13. The apparatus of claim 12 wherein said electric eye is disposed adjacent to said delatcher.

14. The apparatus of claim 9 wherein said light beam is projected angularly across said conveyor such that a point at which the mold breaks said light beam as it moves along said conveyor is longitudinally spaced from a point at which the mold is no longer breaking said light beam.

15. The apparatus of claim 14 wherein said light beam is projected at least partially through said delatcher.

16. An apparatus for opening a food product mold, having a first mold portion and a second mold portion which can be latched together, said apparatus comprising:

a conveyor for receiving a latched mold thereon with a food product in the mold and for moving the mold;

a delatcher attached to said conveyor and comprising:
a mold engagement means for engaging the first portion of the mold; and
a mold support for supporting the second mold portion when the first mold portion is engaged by said mold engagement means;
wherein, the first mold portion is held substantially stationary against the mold support while the first mold portion is moved toward the second mold support such that the first and second mold portions are unlatched from one another and the first mold portion and the food product are normally separated from the second mold portion by gravity;

a puller device for engaging the first mold portion and pulling the first mold portion away from the second mold portion in the event that the first mold portion does not separate properly from the second mold portion by gravity; and weight sensing means for sensing when the first mold portion and the food product are separated from the second mold portion by gravity, said weight sensing means being adapted for preventing actuation of said puller device when weight is sensed and adapted for actuating the puller device when weight is not sensed.

17. The apparatus of claim 16 wherein said weight sensing means comprises:
a pivot gate adjacent to said first conveyor, said pivot gate being pivotable between said weight sensing position and said non-weight sensing position; and
a counter-weight attached to said pivot gate and adapted for biasing said pivot gate toward said non-weight sensing position.

18. An apparatus for opening a food product mold, having a first mold portion and a second mold portion which can be latched together, said apparatus comprising:

a conveyor for receiving a latched mold thereon with a food product in the mold and for moving the mold;

a delatcher adjacent to said conveyor and comprising:
a mold engagement means for engaging the first portion of the mold; and
a mold support for supporting the second mold portion when the first mold portion is engaged by said mold engagement means;
wherein, the second mold portion is held substantially stationary against the mold support while the first mold portion is moved toward the second mold portion such that the first and second mold portions are unlatched from one another; and a delay gate adjacent to said conveyor, said delay gate being selectively actuable between a closed position wherein molds which have been delatched and moved away from said delatcher are prevented from further movement on said conveyor and an open position wherein molds are allowed to move on said conveyor.

19. The apparatus of claim 18 further comprising a microswitch disposed adjacent to said delay gate;

wherein, as said conveyor moves a mold through said delay gate, the mold contacts said microswitch and thereby actuates it such that said delay gate is actuated to said closed position.

20. The apparatus of claim 19 wherein said microswitch initiates a time delay, after which said delay gate is actuated to its open position.

21. An apparatus for opening a food product mold, having a first mold portion and a second mold portion which can be latched together, said apparatus comprising:
   a first conveyor adapted for moving a mold positioned thereon;
   a second conveyor disposed above at least a portion of said first conveyor, said second conveyor being adapted for grippingly engaging the second mold portion and moving the second mold portion therealong, such that the second mold portion is raised above, and thereby separated from, the first mold portion.

22. The apparatus of claim 21 wherein said second conveyor comprises a pair of spaced belts, said belts having outer surfaces thereon which are vertically oriented, said pair of conveyor belts being adapted for grippingly engaging the second mold portion.

23. The apparatus of claim 22 further comprising a plurality of gripper pads disposed on said outer surfaces of said conveyor belts.

24. The apparatus of claim 21 further comprising a delay gate adjacent to an entry side of said second conveyor, said delay gate being selectively actuable between a closed position wherein molds are prevented from movement on said first conveyor and an open position wherein molds are allowed to move on said first conveyor.

25. The apparatus of claim 24 further comprising a microswitch disposed adjacent to said delay gate;
   wherein, as said first conveyor moves a mold through said delay gate, the mold contacts said microswitch and thereby actuates it such that said delay gate is actuated to said closed position.

26. The apparatus of claim 25 wherein said microswitch initiates a time delay, after which said delay gate is actuated to its open position.

27. The apparatus of claim 21 further comprising a puller device for engaging the first mold portion and pulling the first mold portion away from the second mold portion in the event that the first mold portion does not separate properly from the second mold portion by gravity.

28. The apparatus of claim 27 wherein said puller device comprises:
   a main cylinder adjacent to said first conveyor and actuable between extended and retracted positions thereof;
   a rod connected to said main cylinder and movable therewith;
   a side cylinder attached to said rod and movable therewith when said main cylinder is actuated between said extended and retracted positions thereof, said side cylinder being actuable between engaging and disengaging positions thereof; and
   a clamp attached to said side cylinder and movable therewith;
   wherein, when said main cylinder is in said extended position, said side cylinder may be moved to the engaging position such that said clamp is engaged with the first mold portion, after which the main cylinder is moved to the retracted position thereof such that the first mold portion, engaged by the clamp, is pulled away from the second mold portion.

29. The apparatus of claim 28 wherein:
   said rod is one of a pair of rods disposed on opposite sides of said conveyor; and
   said side cylinder is one of a pair of side cylinders, each side cylinder being attached to an end of one of said rods.

30. The apparatus of claim 24 further comprising:
   a weight sensing pivot gate for sensing when the first mold portion and the food product are separated from the second mold portion by gravity, said weight-sensing pivot gate being adapted for preventing actuation of said puller device when weight is sensed and adapted for actuating the puller device when weight is not sensed.

31. The apparatus of claim 30 further comprising a counter-weight attached to said pivot gate and adapted for biasing said pivot gate toward said non-weight sensing position.

32. The apparatus of claim 21 further comprising a delatcher comprising:
   a mold support mounted above said first conveyor;
   a cylinder disposed below said mold support, said cylinder being actuable between an extended position wherein said cylinder engages said first mold portion and a retracted position disengaged from said first mold portion;
   wherein, the second mold portion is held substantially stationary against the mold support when the cylinder is in said extended position whereby said first mold portion is moved toward said second mold portion such that the first and second mold portions are unlatched from one another.

33. An apparatus for opening a food product mold, having a lid and pan which are connectable by spring-loaded latches, said apparatus comprising:
   a first conveyor for receiving a latched mold thereon with a food product in the mold and for moving the mold;
   a delatcher adjacent to said conveyor and comprising:
      a mold engagement means for engaging the lid of the mold; and
      a mold support for supporting the pan of the mold when the lid is engaged by the mold engagement means;
      wherein, the pan is held substantially stationary against the mold support while the lid is moved toward the pan such that the lid and pan are unlatched from one another; and
   a second conveyor disposed above at least a portion of said first conveyor and adapted for grippingly engaging the pan and moving the pan therealong, such that the pan is raised above, and thereby separable from, the lid.

34. The apparatus of claim 33 wherein:
   the mold is positioned on said first conveyor in an inverted position such that the lid is below the pan; and
   said mold engagement means is adapted for contacting the lid from below.

35. The apparatus of claim 33 wherein said mold engagement means is characterized by a cylinder actuable between an extended position engaging the lid of the mold and a retracted position spaced from the lid of the mold.

36. Apparatus of claim 33 further comprising:
   an electric eye disposed adjacent to said delatcher, said electric eye projecting a light beam therefrom;
   wherein, said mold engagement means is adapted for engaging said lid when a mold passing through said delatcher breaks light beam.

37. The apparatus of claim 33 wherein said first conveyor comprises a pair of spaced conveyor belts defining a gap therebetween;
   wherein, said gap is sized to receive latches and springs connected to the lid of the molds therethrough.

38. The apparatus of claim 37 further comprising:
a slide table positioned adjacent to said first conveyor, said slide table defining a gap therebetween, aligned with said gap between said conveyor belts on said first conveyor.

39. The apparatus of claim 33 wherein said second conveyor comprises a pair of spaced belts, said belts having substantially vertically oriented outer surfaces thereon.

40. The apparatus of claim 39 further comprising a plurality of gripper pads disposed on said outer surfaces of said belts, said gripper pads being adapted for grippingly engaging the pan of the molds.

41. The apparatus of claim 33 further comprising a staging gate adjacent to said first conveyor, said staging gate being selectively actuable between a closed position wherein said molds are prevented from moving on said first conveyor and an open position wherein molds are allowed to move on said first conveyor.

42. The apparatus of claim 41 wherein said staging gate is actuated between said closed and open positions thereof by a pneumatic cylinder.

43. The apparatus of claim 12 further comprising an electric eye projecting a light beam therefrom;
wherein, said cylinder is adapted for being actuated to move said staging gate to said closed position when a mold moving along said first conveyor breaks said light beam and being actuated to move said gate to said closed position when the mold is no longer breaking said light beam.

44. The apparatus of claim 43 wherein said electric eye is disposed adjacent to said delatcher.

45. The apparatus of claim 44 wherein said light beam is projected angularly across said first conveyor such that a point at which the mold breaks said light beam as it moves along said first conveyor is longitudinally spaced from a point at which the mold is no longer breaking said light beam.

46. The apparatus of claim 45 wherein said light beam is projected at least partially through said delatcher.

47. The apparatus of claim 33 further comprising a delay gate adjacent to said first conveyor, said delay gate being selectively actuable between a closed position wherein molds which have been delatched are prevented from movement on said first conveyor and an open position wherein molds are allowed to move on said first conveyor toward said second conveyor.

48. The apparatus of claim 47 wherein said delay gate is actuated between said open and closed positions thereof by a pneumatic cylinder.

49. The apparatus of claim 48 further comprising a microswitch disposed adjacent to said delay gate;
wherein, as said first conveyor moves a mold through said delay gate, the mold contacts said microswitch and thereby actuates said cylinder such that said delay gate is moved to said closed position.

50. The apparatus of claim 49 wherein said microswitch initiates a time delay, after which said cylinder is actuated to move said delay gate to its open position.

51. The apparatus of claim 33 wherein the pan and the food product are normally separated from the second mold portion by gravity as the pan is raised above said first conveyor by said second conveyor.

52. The apparatus of claim 51 further comprising a lid puller adapted for engaging at least springs oh the lid and pulling the lid away from the pan in the event that the lid does not separate properly from the pan by gravity.

53. The apparatus of claim 52 wherein said lid puller comprises:
a main cylinder adjacent to said first conveyor and actuable between extended and retracted positions thereof;
a bar connected to said main cylinder and movable therewith as said main cylinder is moved between said extended and retracted positions thereof;
a pair of rods, each rod connected to an end of said bar and movable therewith;
a pair of side cylinders, each side cylinder being attached to one of said rods and movable therewith when said main cylinder is actuated between said extended and retracted positions thereof, each side cylinder being actuable between engaging and disengaging positions thereof; and
a pair of clamps, each clamp being attached to one of said side cylinders and movable therewith;
wherein, when said main cylinder is in said extended position, said side cylinders may be actuated to the engaging position such that said clamps are engaged with at least the springs connected to the lid, after which said main cylinder is moved to the retracted position thereof such that the lid, engaged by said clamps, is pulled away from the pan.

54. The apparatus of claim 52 further comprising a pivot gate disposed below said first and second conveyors and adapted for sensing when the lid and the food product are separated from the pan by gravity and being further adapted for preventing actuation of the lid puller when weight is sensed on said pivot gate and adapted for actuating said lid puller when weight is not sensed on the pivot gate.

55. The apparatus of claim 54 further comprising a counter-weight to said pivot gate and adapted for biasing said pivot gate toward said non-sensing position.

56. The apparatus of claim 55 further comprising a stop for limiting movement of said counter-weight such that application of excessive torque on said pivot gate by said counter-weight is prevented.

57. The apparatus of claim 51 further comprising:
a transfer cylinder disposed adjacent to a discharge end of said first conveyor, said transfer cylinder being actuable between extended and retracted positions thereof; and
a food product slide attached to said cylinder such that said food product slide engages a food product on a mold adjacent to said food product slide when said transfer cylinder is actuated such that said food product is moved off of said lid.

* * * * *

UNITED STATES PATENT AND TRADEMARK OFFICE
CERTIFICATE OF CORRECTION

PATENT NO. : 6,582,214 B1
DATED : June 24, 2003
INVENTOR(S) : Rodney D. Groepper

It is certified that error appears in the above-identified patent and that said Letters Patent is hereby corrected as shown below:

Column 11,
Line 3, before "wherein," delete "of said mold".
Line 65, delete "9" and insert -- 13 -- therefor.

Column 15,
Line 21, delete "12" and insert -- 42 -- therefor.

Signed and Sealed this

Fourteenth Day of October, 2003

JAMES E. ROGAN
*Director of the United States Patent and Trademark Office*